Patented July 10, 1945

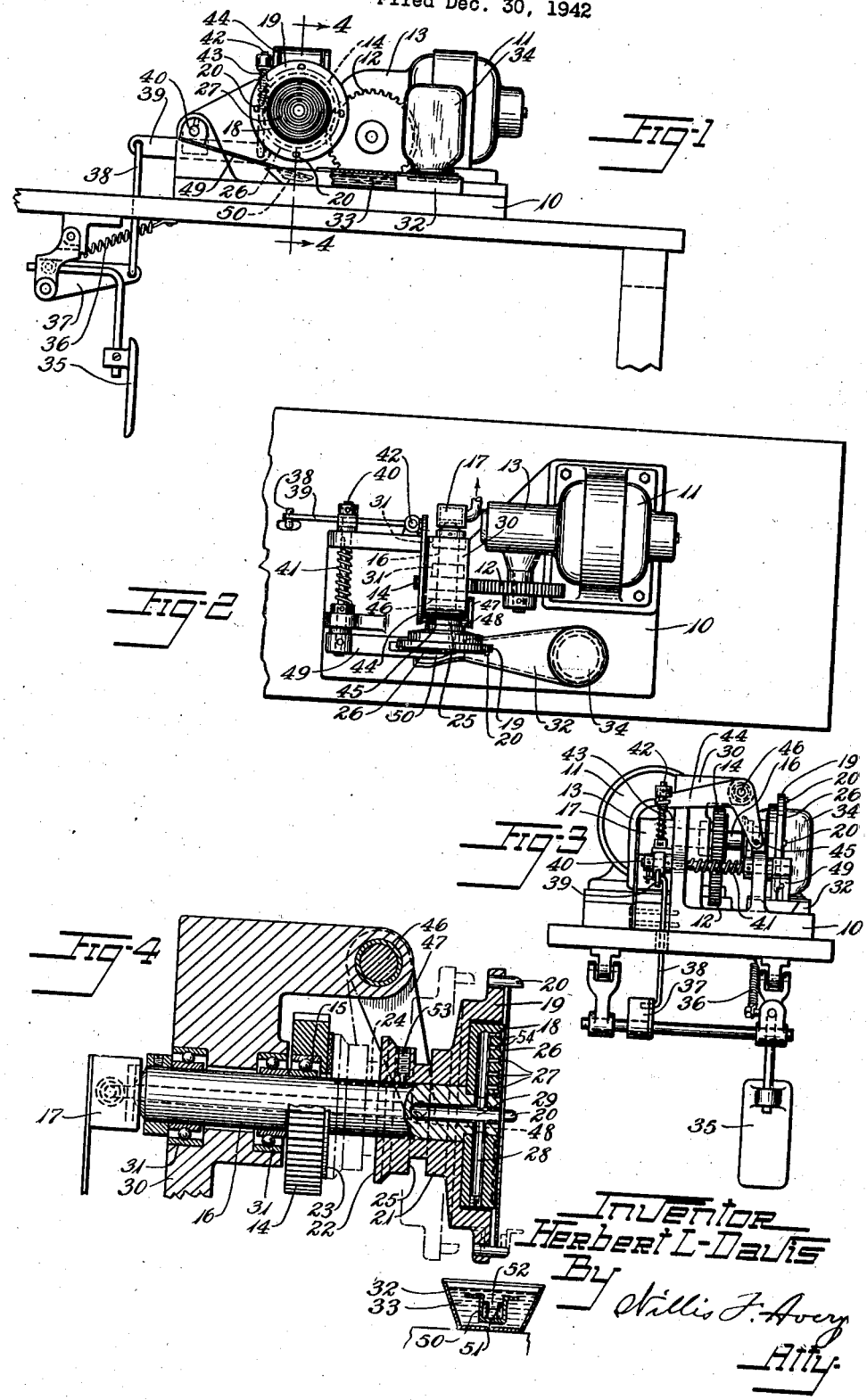

2,379,951

UNITED STATES PATENT OFFICE 2,379,951

COATING MACHINE

Herbert L. Davis, Walpole, Mass., assignor to The B. F. Goodrich Company, New York, N. Y., a corporation of New York Application December 30, 1942, Serial No. 470,559

21 Claims. (Cl. 91—12)

This invention relates to a machine for applying liquid coating materials to annular areas of objects, and relates particularly to a machine for applying cementing materials to the edge and peripheral areas of gas mask eye-pieces, and other similar substantially flat, circular objects.

It is the principal object of this invention to provide a machine for coating annular areas of objects with liquid coating materials. It is another object of this invention to provide a machine for applying cementing materials to the edge and peripheral areas of substantially flat, circular objects. It is still another object of this invention to provide a machine for applying cementing materials to the edge and peripheral areas of flat, circular, and substantially air-impervious flexible objects such as transparent plastic eye-pieces for gas masks. Other objects will become apparent in the detailed description of the invention that is given hereinafter.

I attain these and other objects of my invention by providing a semi-automatic machine for coating annular areas on objects. With this machine I am able to position individual objects of a series in the same relative location on the machine and to hold them in this location. While the object is thusly held a liquid coating material is applied to an annular area on the object. My machine has several important and novel features all cooperating to make the coating of annular areas rapid and easy. In the machine there are provided retractable locating means for locating the object, holding means for holding the object in position, and retracting means for retracting the retractable locating means after the object is thus located. Then after the individual object is in its proper location with the locating means retracted, rotating means rotate the object around an axis passing through the object, and applicator means apply liquid coating material to an annular area on the object while it is being rotated. The applicator means conveniently may be a transferring means for transferring small portions of the liquid coating material from a reservoir to the area of the object that is to be coated.

In the preferred instance where an annular area on a substantially flat object is coated with a liquid coating material, the locating means are preferably retractable locating pins arranged in substantial conformation to the shape of the flat object. The object is then rotated around an axis of rotation passing at substantially right angles through the plane of the object. Where the flat object is of a circular shape the locating means may be a retractable annular plate with protruding pins set therein. With flexible objects the holding means may be a vacuum plate preferably of circular configuration fitted within the annular retractable plate in such a manner that they both lie in substantially the same plane. This is particularly true where the flat object to be coated is formed of flexible material relatively impervious to air.

The invention can best be understood by reference to a particular machine designed for coating the edge and peripheral areas of transparent flexible eye-pieces for gas masks with liquid cementing material. Such a machine is illustrated in the accompanying drawing, of which Figure 1 is an elevation of a machine embodying this invention;

Fig. 2 is a top view of the machine of Fig. 1;

Fig. 3 is an end view of the machine of Fig. 1;

Fig. 4 is a section taken along line 4—4 of Fig. 1 with portions broken away.

Modern gas masks are usually provided with eye-pieces of flat, circular configuration cut from a sheet of flexible transparent plastic such as a copolymer of polymerized vinyl acetate and polymerized vinyl chloride, or similar material. In assembling the masks it is necessary that a cement such as rubber cement, a latex cement, or similar cementing material be used to adhere the eye-pieces to the face covering portion of the mask. This is done by applying the cement to the edge and peripheral areas of the eye-pieces prior to assembling the mask. To accomplish this cementing operation with speed and thoroughness the machine illustrated in the accompanying drawing was designed and built.

The machine consists of a compact unit mounted on a base 10 so as to be easily movable from place to place. On the base there is mounted a small, electrically driven motor 11 operating a toothed gear 12 through a gear reducer 13. This toothed gear 12 intermeshes with a second toothed gear 14 mounted concentrically, through a ball bearing assembly 15, on a hollow shaft 16. The hollow shaft 16 communicates at one end with a vacuum box 17 connected to a source of vacuum, such as a pump (not shown) and at the other end with a circular vacuum plate 18 placed substantially at right angles to the axis of the hollow shaft 16 and concentric therewith. In the following description the vacuum plate 18 will be considered to be at the front of the machine and the vacuum box 17 at the rear of the machine, as illustrated in Figs. 1 and 2 of the drawing.

Locating means are provided for locating the circular eye-piece on the vacuum plate prior to applying the cementing material. This locating means comprises an annular plate 19 located at the front end of the hollow shaft 16 and concentric therewith. The annular plate 19 is provided with four locating pins 20, 20 equally spaced about a circle concentric with the hollow shaft 16. The plate 19 progresses rearwardly into a collar 21 fitted around the hollow shaft 16 and slidably mounted thereon so that the annular plate 19 and the collar 21 are free to slide back and forth on the shaft 16. The rear end of the collar 21 is provided with a flat surface 22 substantially parallel to the plane of the front annular plate 19. This flat surface is machined to provide a close fit for frictional engagement with a leather clutch disk 23 of annular shape located on the front side of the second toothed gear 14. Within the collar 21 there is positioned a pin 53 whose lower end engages a key way 24 on the hollow shaft 16. This construction is provided so that the annular plate 19 and collar 21 may slide back and forth on the hollow shaft 16 and yet revolve with the shaft when the shaft is revolved. On the outer surface of the collar 21 there is provided a groove 25 extending around the collar. The purpose of this groove will be explained in detail later.

The holding means for holding an eye-piece 26 in position after it has been located in the machine comprises a flat, circular vacuum plate 18 at the front end of the hollow shaft 16 and fitted within the annular locating plate 19 which encircles the vacuum plate so that both plates have front surfaces lying in the same plane, this plane being at substantially right angles to the axis of the hollow shaft 16. The diameter of the vacuum plate should be less than the diameter of the eye-piece to be coated so that an annular edge portion of the eye-piece will project beyond the rim of the vacuum plate and over the locating plate. The vacuum plate 18 is provided with grooves 27 in the form of concentric circles connected, by means of short passageways 54, 54 and a manifold arrangement 28 (Fig. 4), to the hollow portion 29 of the shaft 16 which in turn connects to a source of vacuum through a vacuum box 17 at the rear of the shaft. The vacuum plate is keyed to the shaft 16 so that when the shaft revolves the plate also revolves. The shaft 16 is supported in a housing 30 by means of several ball bearing assemblies 31, 31 which permit the shaft to revolve freely.

At the front end of the machine and just below the vacuum plate there is located a reservoir trough 32 for holding a supply of cementing or coating material 33. This trough 32 is kept filled in any convenient manner as by the inverted jar 34. When the cement in the reservoir 32 falls below the opening in the jar, air enters the jar and additional cement is fed to the reservoir until the level rises high enough to shut off the air. By this method a constant supply of cementing material is maintained in the reservoir.

In order to operate the machine, there are provided a series of levers and cranks all cooperating together. The first of these levers is a knee-operated lever 35 held normally in vertical position by means of a spring 36. This knee lever operates through a crank arm 37 to a second vertical lever 38 arranged for vertical movement along its principal axis. At the top of the vertical lever 38 there is connected a pivoted arm 39 arranged in horizontal position at the rear of the machine and adapted to turn on a horizontal rod 40 keyed to the pivoted arm and supported by two supports, one at the front of the machine and the other at the rear. The pivoted arm 39 is held in normally horizontal position by means of a second spring 41 coiled around the horizontal rod 40.

On the end of pivoted arm 39 opposite the vertical lever 38 there is provided a vertical push rod 42. This push rod 42 is supported in its vertical position by means of two collars mounted on the housing covering the hollow shaft, and between these two collars there is located a third spring 43 arranged so as normally to hold the push rod 42 at its lowest vertical position.

At the top end of the push rod 42 there is connected one arm of a bell crank 44. The other arm of the bell crank 44 is provided at its end with a stud 45 engaging the groove 25 in the collar 21 which is located at the rear of the annular locating plate 19. The bell crank 44 is keyed to a fulcrum rod 46 arranged horizontally in the machine at a position over the hollow shaft and at substantially right angles thereto. The other end of the fulcrum rod 46 is keyed to a lever 47 having generally the same shape as, and arranged substantially parallel to, the arm of the bell crank 44 that contains the stud 45. This lever also has a stud 48 at its end which engages the groove 25 in the collar 21 at a point substantially diametrically opposite the point where the stud 45 on the bell crank 44 engages the groove 25.

At the front end of the horizontal rod 40 there is provided a ladle arm 49 keyed to the rod 40 and extending down into the cementing material reservoir 32. On the end of this ladle arm 49 there is provided a ladle 50 for raising the cementing material into contacting relationship with the edge of an eye-piece 26 positioned on the vacuum plate 18. In the ladle 50 there is a flat plate 51 with a cut out slot 52 arranged so that the edge of the eye-piece 26 passes through the slot 52 while the eye-piece is being revolved.

In operating the machine described herein the vacuum supply is turned on and then the motor 11 is started. This revolves the toothed gear 12 and the intermeshing second gear 14 around the hollow shaft 16 mounted on its ball bearings 15. Because of these ball bearings 15 the shaft 16 does not turn with the gear 15. A gas mask eye-piece 26 is manually positioned between the four locating pins 20, 20 on the annular locating plate 18 and the vacuum in the concentric grooves 27 of the vacuum plate 18 holds the eye-piece tightly against the vacuum plate. The operator of the machine then pushes the knee lever 35 to the left which serves to pull down the vertical lever 38 against the restraint of a spring 36 that normally holds the knee lever 35 in a vertical position. The vertical lever 38 operates on a pivoted arm 39 to pull the left side of the arm down. This shoves the right side of the pivoted arm up against the restraint of a second spring 41 through which runs the vertical push rod 42 extending from the right side of the pivoted arm to an arm on the bell crank 44. The arm on the bell crank 44 is likewise shoved up so that the bell crank pivots on a fulcrum rod 46 to whose other end is fixed the lever 47. This lever is arranged parallel to the free arm of the bell crank 44 and is of substantially the same size and shape as this free arm. When the bell crank 44 pivots on the fulcrum rod 46 the free arm of the bell crank 44 and the parallel lever 47 force the collar 21 back along the hollow shaft 16, thus retracting the locating plate 19 and the pins 20 and exposing the projecting edge portions of the eye-piece 26. This movement occurs through a stud 45 positioned at the extremity of the free end of the bell crank 44 and another stud 46 at the end of the parallel lever 47, both studs engaging the groove 25 in the collar 21. As the collar 21 moves back along the hollow shaft 16, the flat surface 22 of the collar 21 engages the leather clutch disk 23 on the rotating second gear 14. This causes the collar and the annular locating plate to revolve. The shaft 16 also is caused to revolve by means of the pin 53 acting in the key way 24 in the shaft. The revolving of this shaft likewise causes revolving of the vacuum plate 18 and, with it, the vacuum-held eye-piece 26.

Liquid cementing material 33 is applied to the edge and peripheral areas of the eye-piece by the ladle 50 which lifts cementing material 33 from the reservoir 32 to the edge of the eye-piece 26. This is brought about in the following manner: As soon as the knee lever 35 is pushed to the left the pivoted arm 39 turns on the rod 40 extending from the pivoted arm 39 at the rear of the machine to a ladle arm 49 at the front of the machine. As both the pivoted arm 39 and the ladle arm 49 are keyed to the rod, movement of the pivoted arm causes a corresponding movement in the ladle arm. The ladle arm 49 lifts the ladle 50 against restraint of the spring 41 coiled around the rod and places the ladle 50 so that its load of cementing material 33 contacts the edge areas of the eye-piece 26. By this time, of course, the annular locating plate 18 has been retracted out of normal position, and revolution of the hollow shaft 16 has caused the eye-piece 26 to revolve. Looking at the machine as illustrated in Fig. 1, the eye-piece revolves in a clockwise direction so that a given point on the edge of the eye-piece enters the cementing material in the ladle 50 from the right and leaves at the left, the edge of the eye-piece being directed into the slot 42 in the plate 51 in order to effect more even distribution of cement on the eye-piece.

After the eye-piece 33 receives a sufficient coating by several rotations through the cement, pressure on the knee lever 35 is released. The attached spring 36 pulls the lever back in vertical position, the pivoted arm 39 assumes its normally horizontal position, the ladle 50 is lowered back into the reservoir 32, the hollow shaft 16 stops revolving, and the annular locating plate 19 is pushed forward along the hollow shaft 16. The coated eye-piece is then manually removed from the vacuum plate 18 and the machine is ready to start a new cycle of operations on another eye-piece.

The speed of revolution of the eye-piece depends upon many factors, including the type of cement material to be applied, its degree of fluidity, the thickness of the layer of cementing material desired, and similar variables. In general it may be said that where the cementing material is rubber cement of fairly easy spreadability, the eye-piece should revolve about 25 R. P. M. The speed, of course, can be regulated by proper choice of gear reducer 13, gear ratio between the first gear 12 and the sceond gear 14, and the proper choice of a motor.

Having described my invention together with details of a typical embodiment thereof, it is my intention that it be construed broadly within the spirit and scope of the invention as set out in the following claims.

I claim:

1. A machine of the character described for applying liquid coating material to an annular area on an object, said machine comprising retractable locating means for positioning the object, holding means for holding the object in its located position, means for retracting the retractable locating means, means for rotating the object around an axis of rotation passing through the object, the retraction of said locating means occurring in a direction along the said axis of rotation, and means for applying liquid coating material to an annular area on the object while it is being rotated.

2. A machine of the character described for applying liquid coating material to an annular area of an object, said machine comprising retractable locating means including pins for positioning the object, holding means for holding the object in said position, retracting means for retracting the retractable pins, rotating means for rotating the object around an axis of rotation passing through the object, and applicator means for applying liquid coating material to an annular area on the object while it is being rotated.

3. A machine of the character described for applying liquid coating material to an annular area on a substantially flat object, said machine comprising retractable locating means including pins arranged in substantial conformation to the shape of the flat object for positioning said object, holding means for holding the flat object in said position, retracting means for retracting the retractable pins, rotating means for rotating the flat object around an axis of rotation passing at substantially right angles through the plane of the object, and applicator means for applying liquid coating material to an annular area on the flat object while it is being rotated.

4. A machine of the character described for applying liquid coating material to an annular area on a substantially flat object of generally circular shape, said machine comprising a retractable substantially annular plate with protruding pins set therein for positioning the circular object, holding means for holding the flat object in said position, retracting means for retracting the annular plate, rotating means for rotating said object around an axis of rotation passing at substantially right angles through the object, and applicator means for applying liquid coating material to an annular area on the circular object while it is being rotated.

5. A machine of the character described for applying liquid coating material to an annular area on a substantially flat flexible object of generally circular shape, said machine comprising a retractable substantially annular plate with protruding pins set therein for positioning the flat flexible object, holding means for holding said object comprising a substantially flat vacuum plate, retracting means for retracting the annular plate, rotating means for rotating the vacuum plate around an axis of rotation passing at substantially right angles through said vacuum plate, and applicator means for applying the liquid cementing material to an annular area on the flexible object while it is held on the vacuum plate and rotated.

6. A machine of the character described for applying liquid cementing material to an annular area on a substantially flat flexible object having a generally circular shape, said machine comprising a retractable substantially annular plate with protruding pins set therein for locating the position of the flat flexible object, holding means for holding said object comprising a substantially flat vacuum plate of circular configuration and fitted within said retractable plate in such a manner that they both lie in substantially the same plane, retracting means for retracting the annular plate, rotating means for rotating the vacuum plate around an axis of rotation passing at substantially right angles through the vacuum plate, and applicator means for applying the liquid cementing material to an annular area on the flexible object while it is held on the vacuum plate and rotated.

7. A machine of the character described for applying liquid cementing material to the edge and peripheral areas of substantially flat flexible object having a generally circular shape, said machine comprising a retractable substantially annular plate with protruding pins set therein for locating the position of the flat flexible object, holding means for holding said object comprising a substantially flat vacuum plate of circular configuration and fitted within said retractable plate in such a manner that they both lie in substantially the same plane, retracting means for retracting the flat annular plate, rotating means for rotating the vacuum plate around an axis of rotation passing at substantially right angles through the center of the vacuum plate, a reservoir for holding a supply of the liquid cementing material, and transfer means for transferring portions of the liquid cementing material to the edge and peripheral areas of the flat flexible object while it is held on the vacuum plate and rotated.

8. In a coating machine of the character described for applying liquid coating material to an object; rotatable holding means; retractable means for locating the object on the holding means; liquid applicator means movable into contact with the object held by the holding means; and actuating means operable to retract the locating means, to initiate rotation of the holding means and to cause the applicator means to move into contact with the object, movement of the applicator means being controlled by movement of at least one of the other means.

9. In a coating machine of the character described for applying liquid coating material to an object; rotatable holding means; retractable means for locating the object on the holding means; liquid applicator means movable into contact with the object held by the holding means; and a single actuating means operable to retract the locating means, to initiate rotation of the holding means and to cause the applicator means to move into contact with the object.

10. In a coating machine of the character described for applying liquid coating material to an object; rotatable holding means; retractable means for locating a generally-flat circular object for symmetrical rotation with the holding means; said retractable locating means including portions extending past the edges of the object; liquid applicator means movable into contact with edge portions of the object; and actuating means operable to retract the locating means sufficiently to expose the said edges, to initiate rotation of the holding means and the object and, thereafter, to move the applicator means into operative engagement with the said edge portions of the object as it rotates.

11. In a coating machine of the character described for applying liquid coating material to an annular edge portion of a generally flat circular object; a rotatable plate of generally circular configuration and smaller diameter than the object, the plate being adapted to receive the object for symmetrical rotation therewith and with the edges of the object projecting beyond the edges of the plate; retractable means adapted to engage the edges of the object for locating it on the plate for such symmetrical rotation; vacuum means for holding the object on the plate; applicator means mounted for movement into liquid-applying engagement with an edge portion of an object held by the holding means; and a single actuating means operable, by a single movement, to retract the locating means and expose the said edges of the object, to apply rotating forces to the holding means and so to effect rotation of the said means and the object and, after such retraction and rotation, to move the applicator means into liquid-applying engagement with an edge portion of the object.

12. In a coating machine of the character described for applying liquid coating material to an annular edge portion of a generally flat circular object; a rotatable plate of generally circular configuration and smaller diameter than the object, the plate being adapted to receive the object for symmetrical rotation therewith and with the edges of the object projecting beyond the edges of the plate; retractable means adapted to engage the edges of the object for locating it on the plate for such symmetrical rotation; vacuum means for holding the object on the plate; applicator means mounted for movement into liquid-applying engagement with an edge portion of an object held by the holding means; and a single actuating means operable, by a single movement, to retract the locating means and expose the said edges of the object, to apply rotating forces to the holding means and so to effect rotation of the said means and the object and, after such retraction and rotation, to move the applicator means into liquid-applying engagement with an edge portion of the object, said single control means also being operable, by a second movement, to withdraw application of the rotating forces and to move the applicator means out of engagement with the object.

13. In a machine of the character described, a rotatable plate of generally flat, circular, configuration; vacuum means for holding an object on the plate for rotation therewith; means for applying rotational forces to the said plate; applicator means for applying liquid material to the object as it is being rotated; and a single means operable to effect application and withdrawal of the rotational forces to the plate and to effect movement of the applicator means into and out of engagement with the object.

14. In a machine of the character described, a rotatable plate of generally circular configuration, means for rotating the plate, retractable means concentrically disposed about the holding plate for locating an object for rotation with the plate, and a single control means operable to start rotation of the plate and to effect retraction of the locating means sufficiently to expose portions of the object engaged by the locating means.

15. In a coating machine of the character described for applying liquid coating material to an annular edge portion of a generally flat, circular object such as a gas-mask eye-piece, means for holding the object and power means connected directly to the holding means for rotating the said object with its edge portions exposed, a reservoir for the liquid coating material, liquid-transferring applicator means movable from the reservoir into liquid-applying engagement with the edge portion of the object, and a single actuating means operable to effect rotation of the object and to move the applicator means into engagement with the object.

16. In a coating machine of the character described for applying liquid coating material to an annular edge portion of a generally flat, circular object such as a gas-mask eye-piece, means for holding and rotating the object with its edge portions exposed, a reservoir for the liquid coating material, liquid-transferring applicator means movable from the reservoir into liquid-applying engagement with the edge portion of the object, and a single actuating means operable, by a single movement, to apply rotational forces to the object and thereafter to move the applicator into engagement with the object and operable, by a second movement, to remove the applicator means from the object and to withdraw the rotational forces.

17. A machine for applying liquid coating material to the peripheral edge portion of a generally flat, circular object such as a gas-mask eye-piece, said machine comprising means for holding the object with its peripheral edge portion exposed, means for rotating the aforesaid means together with the object held by it, and a ladle adapted to carry liquid coating material, the ladle being mounted for movement into and out of engagement with the peripheral edge portion of the rotating object.

18. A machine for applying liquid coating material to the peripheral edge portion of a generally flat, circular object such as a gas-mask eye-piece, said machine comprising means for holding the object with its peripheral edge portion exposed, means for rotating the aforesaid means together with the object held by it, and a ladle adapted to carry liquid coating material, the ladle being mounted for movement into and out of engagement with the peripheral edge portion of the rotating object and comprising means embracing the said peripheral edge and an adjacent portion of each face of the object while in engagement with it, whereby coating material is applied simultaneously to a zone covering the peripheral edge of the object and extending some distance down each face thereof from the periphery.

19. A machine for applying liquid coating material to the peripheral edge portion of a generally flat, circular object such as a gas-mask eye-piece, said machine comprising means for holding the object in a generally vertical plane with its peripheral edge portion exposed, means for rotating the aforesaid means together with the object held by it, a reservoir for the liquid coating material disposed beneath and out of contact with the peripheral edge of the said object, a ladle adapted to contain a limited quantity of the liquid coating material, and means for causing the ladle to dip into the liquid coating material in the said reservoir and then to move upwardly into engagement with the periphery of the said object while it is rotating for applying the coating material thereto.

20. A coating machine of the character described comprising a rotatable vacuum chuck for holding work to be coated, said chuck comprising a rotatable plate having a generally flat work-engaging face and said face having therein a plurality of generally concentric grooves having communication with vacuum-producing means.

21. A coating machine of the character described comprising a rotatable plate of generally circular configuration for holding work to be coated, means concentrically disposed about the said plate for engaging and locating the work on the plate, the last said means being retractable longitudinally of the axis of rotation of said plate, and means for so retracting the aforesaid means sufficiently to clear the portion of the work engaged by it.

HERBERT L. DAVIS.